United States Patent [19]
Guha

[11] Patent Number: 5,844,559
[45] Date of Patent: Dec. 1, 1998

[54] METHOD, APPARATUS AND COMPUTER PROGRAM PRODUCTS TO DISPLAY OBJECTS USING WINDOWS

[75] Inventor: Ramanathan V. Guha, Los Altos, Calif.

[73] Assignee: Apple Computer, Inc., Cupertino, Calif.

[21] Appl. No.: 729,689

[22] Filed: Oct. 7, 1996

[51] Int. Cl.$^6$ .................................................. G06F 3/14
[52] U.S. Cl. ........................................ 345/348; 345/340
[58] Field of Search ................................. 345/348, 339, 345/340, 341, 334, 342, 123, 973

[56] References Cited

U.S. PATENT DOCUMENTS

| | | | |
|---|---|---|---|
| 5,305,435 | 4/1994 | Bronson | 395/159 |
| 5,506,952 | 4/1996 | Choy et al. | 345/348 |
| 5,564,004 | 10/1996 | Grossman et al. | 345/348 |
| 5,611,060 | 3/1997 | Belfiore et al. | 345/341 |
| 5,642,490 | 6/1997 | Morgan et al. | 345/342 |
| 5,652,850 | 7/1997 | Hollander | 345/339 |

OTHER PUBLICATIONS

"Quick Selection of Window Environment Coordinates", IBM Technical Disclosure Bulletin, vol. 35, No. 4B, Sep. 1, 1992, pp. 57–60.

"Determining Where to Place Panels in a Window Environment", IBM Technical Disclosure Bulletin, vol. 35, No. 1A, Jun. 1, 1992, pp. 174–175.

PCT International Search Report for International Application No. PCT/US 97/17750, Mar. 5, 1998.

Primary Examiner—Raymond J. Bayerl
Assistant Examiner—Cao H. Nguyen
Attorney, Agent, or Firm—Fenwick & West LLP

[57] ABSTRACT

Methods, apparati and computer program products prepare objects for display in a window. Objects which would otherwise not be displayed because they have a position outside the borders of the window are repositioned to be displayed inside the window at a position near the border of the window that indicates the original position of the object. Objects that have been repositioned according to the present invention may also have other characteristics modified, such as size, shape, color or display intensity. Where objects are arranged in a hierarchy, they may be displayed in a color corresponding to their level in the hierarchy.

34 Claims, 12 Drawing Sheets

METHOD, APPARATUS AND COMPUTER PROGRAM PRODUCTS TO DISPLAY OBJECTS USING WINDOWS

FIELD OF THE INVENTION

This invention relates to computer user interfaces, and more specifically to user interfaces which display information using windows.

BACKGROUND OF THE INVENTION

Many conventional computer software applications display information to a user on a display screen such as a conventional computer display. When a graphical user interface is used to display information, an element of the information may be displayed as an object on the screen. Referring now to FIG. 1A, many objects 100, 102, 104, 106, 108, 110, 112, 114, 116, 118, 120, 122, 124, 126, 128, 130, 132, 134, 136, 138, 140, 142, 144, 146, 148, 150, 152, 154, 156, 158 are shown.

Many conventional computer software applications utilize a user interface known as a window. The window is used as a portal to the information displayed by the computer software application, and at any time may allow for the display of a subset of the objects 100, 102, 104, 106, 108, 110, 112, 114, 116, 118, 120, 122, 124, 126, 128, 130, 132, 134, 136, 138, 140, 142, 144, 146, 148, 150, 152, 154, 156, 158 which represent the information the software application is capable of displaying. The user is able to navigate among large amounts of information easily, because the user is only required to relate to the portion of the information that is displayed in the window at any time. Referring now to FIG 1B, the objects 100, 102, 104, 106, 108, 110, 112, 114, 116, 118, 120, 122, 124, 126, 128, 130, 132, 134, 136, 138, 140, 142, 144, 146, 148, 150, 152, 154, 156, 158 of FIG. 1A are shown, with some of the objects 100, 102, 104, 106, 108, 110, 112, 114, 116, 118, enclosed in a window 160 displayed on a display screen 172. The window 160 shown in FIG. 1B is a rectangle that has an upper border 162, a left border 164, a right border 166 and a lower or bottom border 168 although other shapes of the window 160 are possible using any number of borders.

A user of the application program sees only the objects 100, 102, 104, 106, 108, 110, 112, 114, 116, 118, representing the information that are within the borders 162, 164, 166, 168 of, or inside, the window 160. In a conventional application program, the remaining objects 120, 122, 124, 126, 128, 130, 132, 134, 136, 138, 140, 142, 144, 146, 148, 150, 152, 154, 156, 158 are not seen at all by the user, although they are shown in FIG. 1B as an aid in understanding. In many conventional computer software applications, only the information represented by the objects 100, 102, 104, 106, 108, 110, 112, 114, 116, 118 that are in the window 160 may be accessed and manipulated by the user.

In order to display, manipulate or access the objects 120, 122, 124, 126, 128, 130, 132, 134, 136, 138, 140, 142, 144, 146, 148, 150, 152, 154, 156, 158 outside the window 160, the user manipulates the window 160, using a pointing device such as a mouse type controller which controls a pointer 170, or using a keyboard in conventional software applications, to position the window 160 over some or all of the objects 100, 102, 104, 106, 108, 110, 112, 114, 116, 118, 120, 122, 124, 126, 128, 130, 132, 134, 136, 138, 140, 142, 144, 146, 148, 150, 152, 154, 156, 158 desired.

As the user positions the window 160 over such desired objects 100, 102, 104, 106, 108, 110, 112, 114, 116, 118, 120, 122, 124, 126, 128, 130, 132, 134, 136, 138, 140, 142, 144, 146, 148, 150, 152, 154, 156, 158, the window 160 does not change position relative to the computer display screen 172 in many conventional application programs. Instead, the display of the objects 100, 102, 104, 106, 108, 110, 112, 114, 116, 118, 120, 122, 124, 126, 128, 130, 132, 134, 136, 138, 140, 142, 144, 146, 148, 150, 152, 154, 156, 158 that are visible in the window 160 is adjusted as if the window 160 had changed its position. For example, to see and manipulate the objects 140, 142, 144, 146, 148, 150, 152, 154, 156, 158 to the right of the window 160, the user would indicate that the window 160 was to move right, but the window 160 would remain in the same position relative to the computer display screen 172. However, the information 140, 142, 144, 146, 148, 150, 152, 154, 156, 158 would scroll into position within the window 160 and the information 100, 102, 104, 106, 108, 110, 112, 114, 116, 118 that was formerly in the window would scroll to the left until it is no longer displayed in the window 160 to simulate the window 160 moving right. During this simulated movement, the relative spacing between the objects 100, 102, 104, 106, 108, 110, 112, 114, 116, 118, 120, 122, 124, 126, 128, 130, 132, 134, 136, 138, 140, 142, 144, 146, 148, 150, 152, 154, 156, 158 remains the same, although some objects 100, 102, 104, 106, 108, 110, 112, 114, 116, 118 scroll out of view and other objects 140, 142, 144, 146, 148, 150, 152, 154, 156, 158 appear.

In the above example, the user is required to know the arrangement of the objects 140, 142, 144, 146, 148, 150, 152, 154, 156, 158 representing desired information relative to the position of the window 160. That is, the user was required to know that objects 140, 142, 144, 146, 148, 150, 152, 154, 156, 158 were to the right of the original position of the window 160 even though those objects were not visible.

Some information lends itself to this knowledge, such as information arranged in a known order. For example, the user of a word processing program may have an idea that the forty fourth chapter of a manuscript is above the forty fifth chapter, and thus, may be able to manipulate the window 160 to locate the desired information. However, where the position of the desired information relative to the information displayed in the window 160 is not readily apparent, it is difficult for the user to locate the desired information by manipulating the window 160. For example, the information may not have an inherent "order" which can be used by the application program to arrange the information in a fashion that would be apparent to the user, or the current position of the window 160 with respect to the desired information may not be readily apparent. To again use the example of the word processing program, it may not be clear to the user of the word processing program which chapter is currently being displayed by the window 160, so the user may not know whether the desired forty fifth chapter is up or down from the text currently displayed in the window 160.

Many computer software applications allow the user to compensate for the lack of knowledge of relative positions of the objects displayed in the window 160 to the positions of the desired objects by allowing the user to zoom in and out, causing more objects to appear on the screen, though smaller in size, as if the window had moved in the z-axis, either closer to the objects or farther away from them. However, in order to see both the objects originally displayed in the window as well as the desired objects, the objects may have to be displayed in a size too small to identify them.

Additionally, some graphical user interfaces display data in three dimensions, allowing the user to navigate past objects in three dimensions like astronauts navigating a spaceship among stars. To provide the three-dimensional look, objects that are a certain distance away from the user in the direction of the z-axis into the screen are not displayed in the same way that distant stars are not visible to the naked eye. Thus zooming out sufficiently in order to see more objects may cause the desired objects to cease to be displayed by the graphical user interface, eliminating the utility of the zoom in/zoom out capability to help identify the direction of desired objects.

Maneuvering through objects displayed in a three-dimensional graphical user interface is also made difficult when the objects are arranged in a hierarchy. Using a two-dimensional graphical user interface, hierarchical arrangements of objects, such as people in an organization chart, may be shown using lines and positions on the screen. Objects in each level of the hierarchy occupy certain areas of the screen to show the level in the hierarchy of the objects, and lines may be drawn to show hierarchical relationships such as parent/child, sibling/sibling, etc. However, lines showing the relationships in a three dimensional user interface would overly clutter the interface making it more difficult to navigate among the objects, and positions are harder to ascertain due to parallax effects.

SUMMARY OF INVENTION

In accordance with the present invention, methods, apparati and computer program products display at or near the border of a window certain objects which have an original position outside the window, and thus, would otherwise not be displayed. Objects so displayed at or near the border of the window are displayed at a position representing the direction of their original position, allowing a user to navigate towards the original position of a desired object by navigating the window toward the displayed position of the object at or near the border of the window. When the window is navigated so as to contain the original position of the desired object, the desired object is displayed away from the border of the window in a conventional manner. Thus, the present invention allows objects which are in the window to be displayed in a manner similar to those displayed by a conventional window, while providing the user an indication of the direction of objects which would not otherwise be visible in the window and therefore not be displayed in a conventional user interface. In addition, hierarchical arrangements of objects may be shown using colors to distinguish the level of each object in the hierarchy, eliminating the need to show relationships using two-dimensional positions of the objects and lines between the objects.

DETAILED DESCRIPTION OF A PREFERRED EMBODIMENT

Figure 1A:
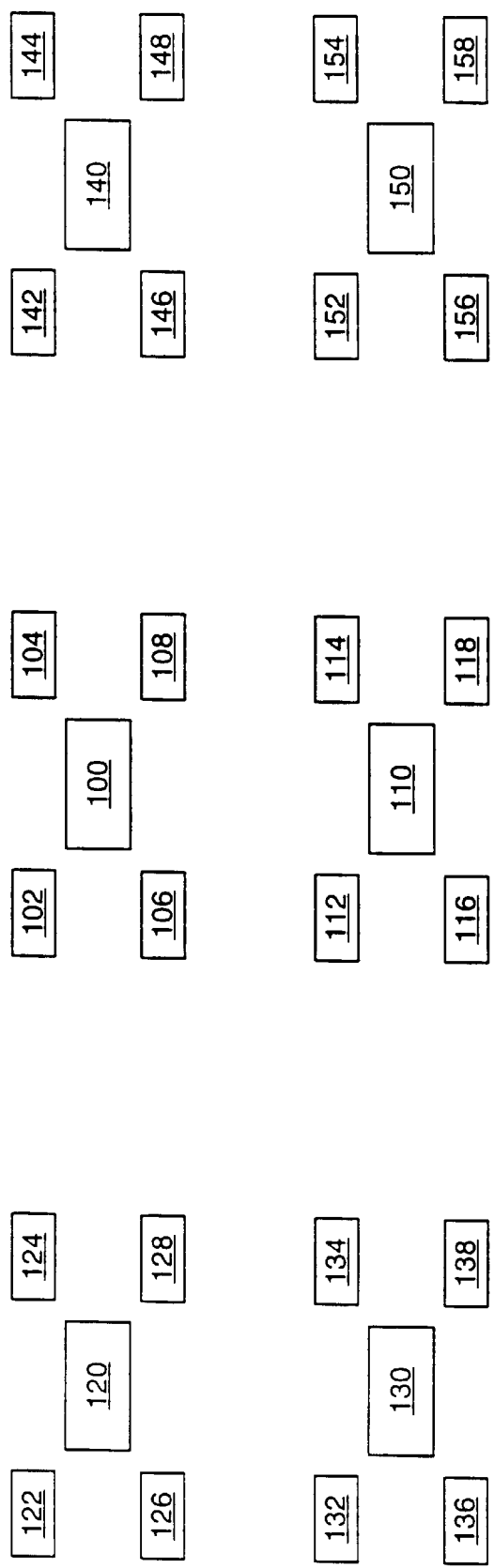
FIG. 1A is a block diagram of a number of objects representing elements of information arranged in space by a conventional application program.

The present invention may be used to display objects in various dimensions. Objects are used to display information such as application program data, files, or other information, and may be displayed as a box or other simple shape, an icon such as a file folder, or a complete set of images displayed in a sequence to simulate a motion picture. Many conventional application programs can display information using two dimensions, in which all of the objects displayed are located on the same plane approximately parallel with the plane of the computer screen 172. Other conventional application programs display information in three dimensions, allowing some objects to be displayed in a manner that represents multiple planes.

The present invention may be used to display information organized in many types of arrangements. One type of arrangement of information that may be displayed using the present invention is a hierarchical arrangement. In such an arrangement, each object is arranged in one of several levels, and may be related to objects at other levels. Objects related to an object on a higher level are said to "descend" from the object on the higher level. The object at the higher level from which an object descends is said to be the "parent" of the object. The family nomenclature is carried out in various ways, with objects sharing the same parent described as "siblings," and the parent of the parent of an object said to be the object's "grandparent." Any object which descends from another object, no matter how many levels removed, is said to be a "descendant" of the object.

Hierarchical arrangements of data lend themselves to a three dimensional display. Referring again to FIG. 1A, objects 100, 110, 120, 130, 140, 150 represent objects on the same level, and objects 102, 104, 106, 108 are the child objects of object 100, objects 112, 114, 116, 118 are the child objects of object 110, objects 122, 124, 126, 128 are the child objects of object 120, objects 132, 134, 136, 138 are the child objects of object 130, objects 142, 144, 146, 148 are the child objects of object 140, and objects 152, 154, 156, 158 are the child objects of object 150. In one embodiment, each object 102, 104, 106, 108, 112, 114, 116, 118, 122, 124, 126, 128, 132, 134, 136, 138, 142, 144, 146, 148, 152, 154, 156, 158 on the child level is displayed differently from the objects 110, 120, 130, 140, 150 on the parent level. The differences between display of objects at different levels may be in one or more of color, size or display intensity of either the object or a portion of the object such as a border of the object. Displaying objects in a different size can provide the illusion of a three dimensional display where objects of each level are displayed on a different plane. For example, child objects 102, 104; 106, 108, 112, 114, 116, 118, 122, 124, 126, 128, 132, 134, 136, 138, 142, 144, 146, 148, 152, 154, 156, 158 appear to be displayed in a plane behind the plane containing their respective parent objects 100, 110, 120, 130, 140, 150. As the user navigates towards the objects 100 102, 104, 106, 108, 112, 114, 116, 118, 122, 124, 126, 128, 132, 134, 136, 138, 142, 144, 146, 148, 152, 154, 156, 158 they grow in size until a plane is passed, at which time the objects in the passed plane disappear. As the user navigates away from the objects 100, 102, 104, 106, 108, 112, 114, 116, 118, 122, 124, 126, 128, 132, 134, 136, 138, 142, 144, 146, 148, 152, 154, 156, 158, they shrink, and as the user backs past a plane, objects appear.

In one embodiment, only the objects in a user-configurable number of planes may be displayed. As the user navigates forward in the z-axis past one plane, the objects in the plane that was passed are no longer displayed, and objects in a plane further back are displayed. The process works in reverse as the user navigates backward. Thus, objects in a user-configurable number of planes in "front" of the user are always displayed.

In one embodiment, hierarchically arranged objects are displayed in three dimensions as described above, although the present invention applies to the display of any type of arrangement of objects in two or more dimensions.

Figure 1B:
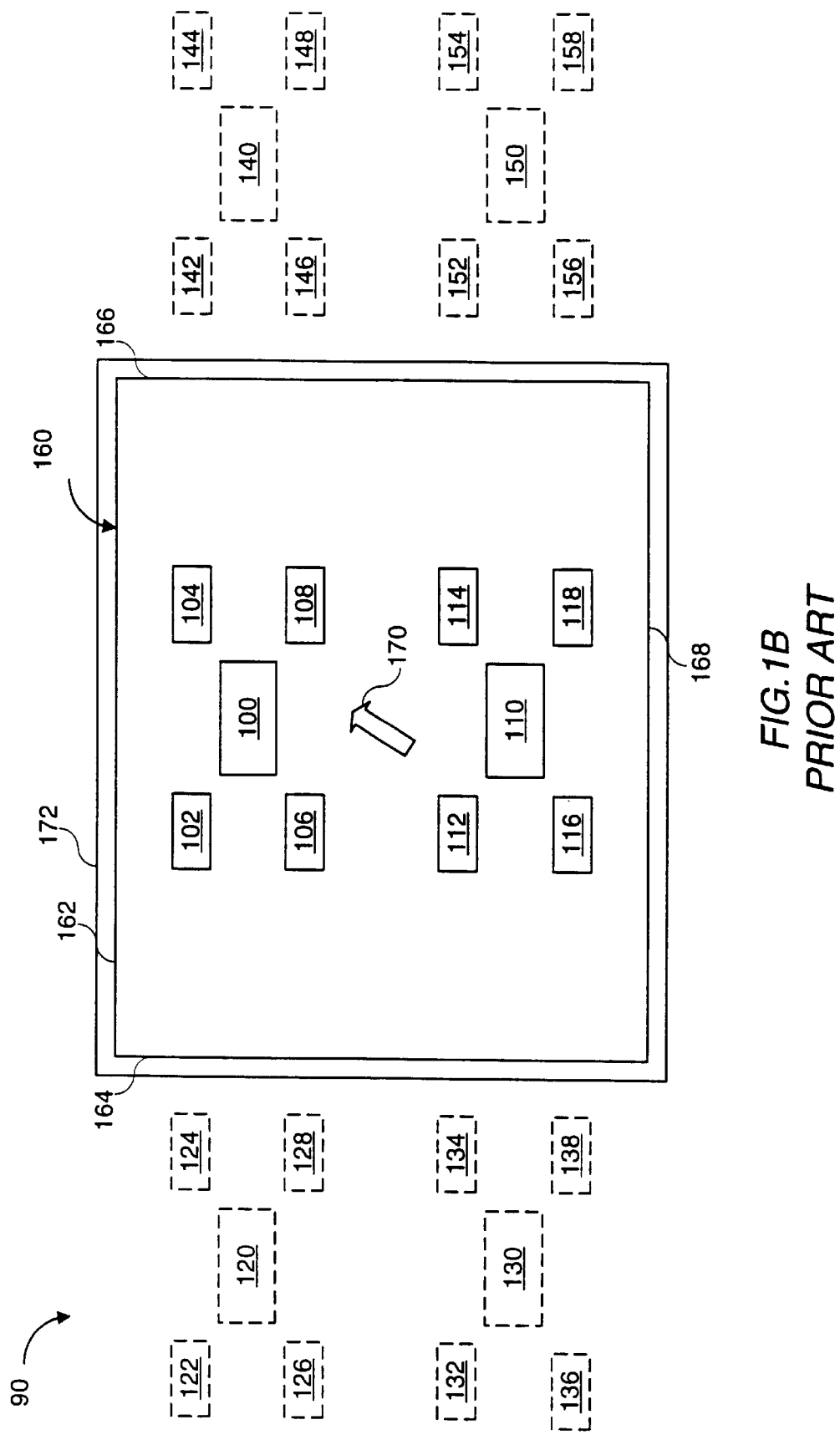
FIG. 1B is a block diagram of the display of objects in a conventional application program in which the objects of FIG. 1A which are located inside a window of a display screen are displayed, and objects not located inside the window are not displayed.
Figure 2A:
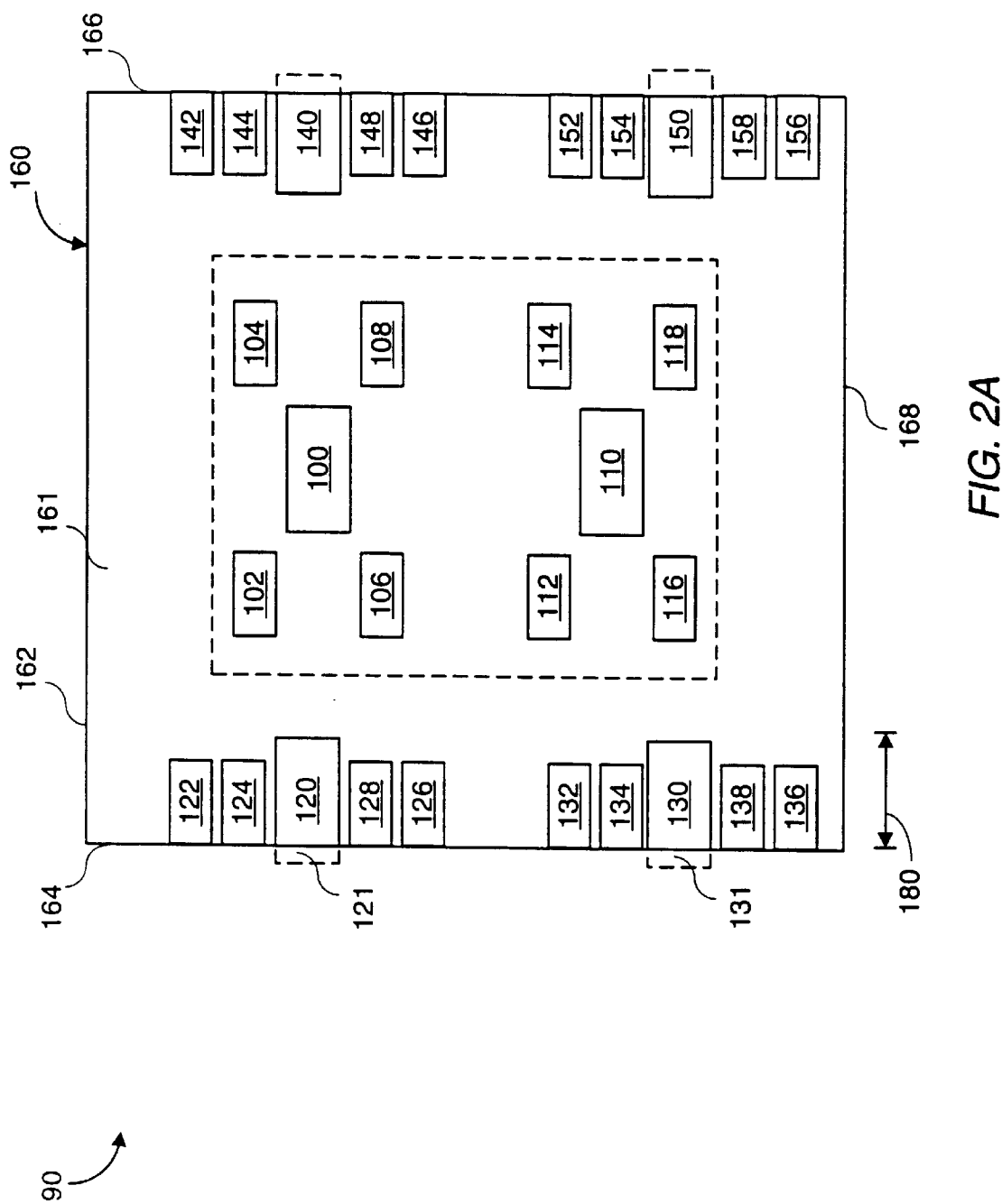
FIG. 2A is a block diagram of the display of the objects of FIG. 1A in a window by an application program according to one embodiment of the present invention.

Referring now to FIG. 2, the objects of FIG. 1B displayed according to one embodiment of the present invention are shown. Some of the objects 100, 102, 104, 106, 108, 110, 112, 114, 116, 118 that would be displayed in the window 160 using conventional display methods are displayed so as to appear as if they were displayed in a conventional fashion. However, other objects 120, 122, 124, 126, 128, 130, 132, 134, 136, 138, 140, 142, 144, 146, 148, 150, 152, 154, 156, 158 that would otherwise not be displayed using conventional methods because they would be located in a position outside the borders 162, 164, 166, 168 of the window 160 are displayed in an outer portion 161 inside the window 160 that is at or near the border 162, 164, 166, 168 nearest the original position of object as shown in FIG. 1B. Because the objects 120, 122, 124, 126, 128, 130, 132, 134, 136, 138, 140, 142, 144, 146, 148, 150, 152, 154, 156, 158 are visible within the window 160 in a manner which shows their direction, a user may more easily navigate the display toward such objects 120, 122, 124, 126, 128, 130, 132, 134, 136, 138, 140, 142, 144, 146, 148, 150, 152, 154, 156, 158.

As the position of the window 160 is navigated relative to the objects 100, 102, 104, 106, 108, 110, 112, 114, 116, 118, 120, 122, 124, 126, 128, 130, 132, 134, 136, 138, 140, 142, 144, 146, 148, 150, 152, 154, 156, 158 representing the data, in one embodiment, the objects 100, 102, 104, 106, 108, 110, 112, 114, 116, 118, 120, 122, 124, 126, 128, 130, 132, 134, 136, 138, 140, 142, 144, 146, 148, 150, 152, 154, 156, 158 are repositioned within the window 160 as described above.

Figure 2B:
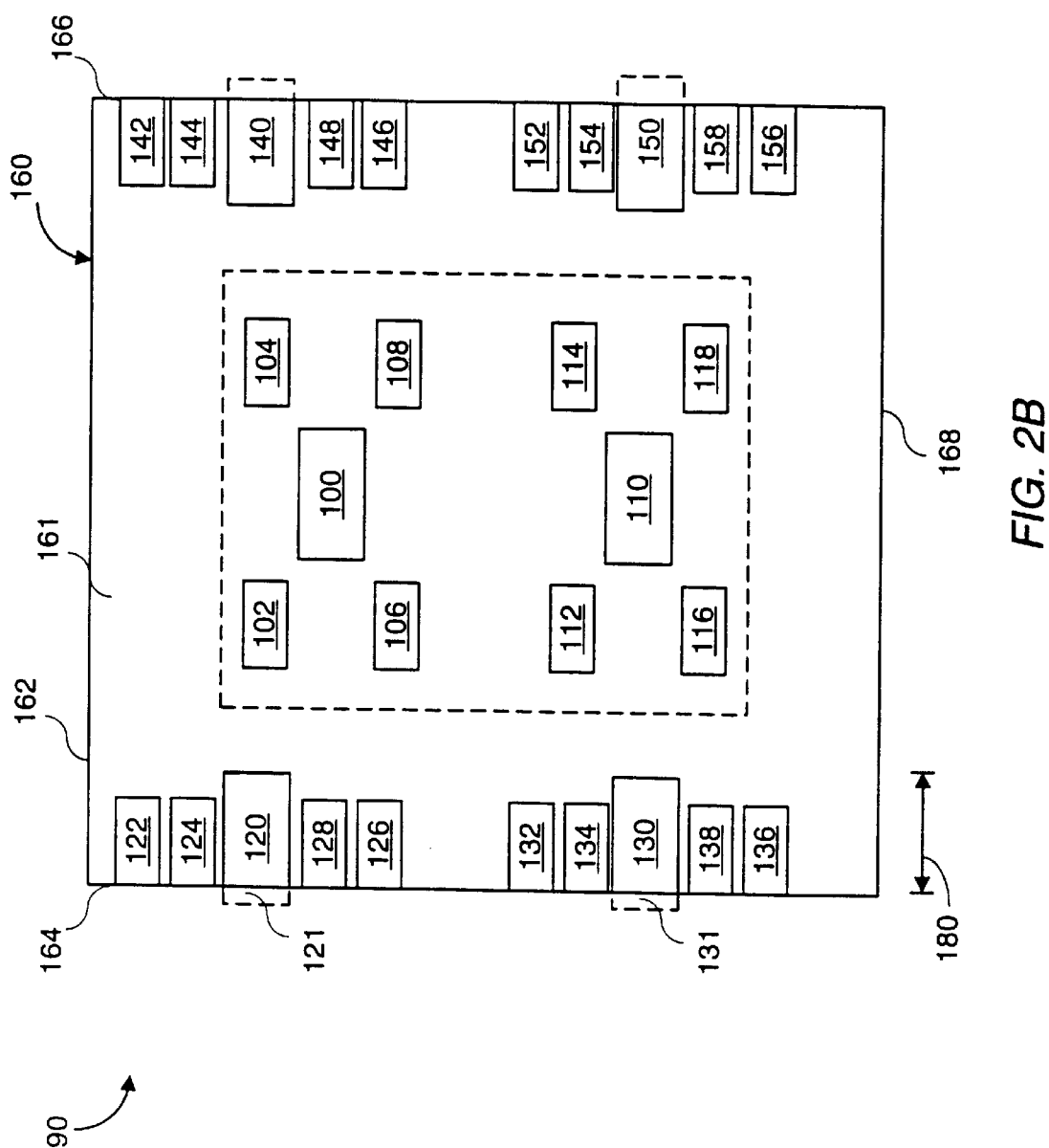
FIG. 2B is a block diagram of the display of the objects of FIG. 2A displayed in the window of FIG. 2A shifted down according to one embodiment of the present invention.

For example, if the user moved the window down slightly, all of the objects 100, 102, 104, 106, 108, 110, 112, 114, 116, 118, 120, 122, 124, 126, 128, 130, 132, 134, 136, 138, 140, 142, 144, 146, 148, 150, 152, 154, 156, 158 would appear to move up relative to the window 160 to reflect their new position relative to the window 160. Thus, as shown in FIG. 2B, objects 120, 122, 124, 126, 128, 130, 132, 134, 136, 138, 140, 142, 144, 146, 148, 150, 152, 154, 156, 158 that would otherwise not be displayed using conventional methods may slide along the borders 162, 164, 166, 168, or even move adjacent to another border 162, 164, 166, 168 depending on their position relative to the window 160.

Figure 2C:
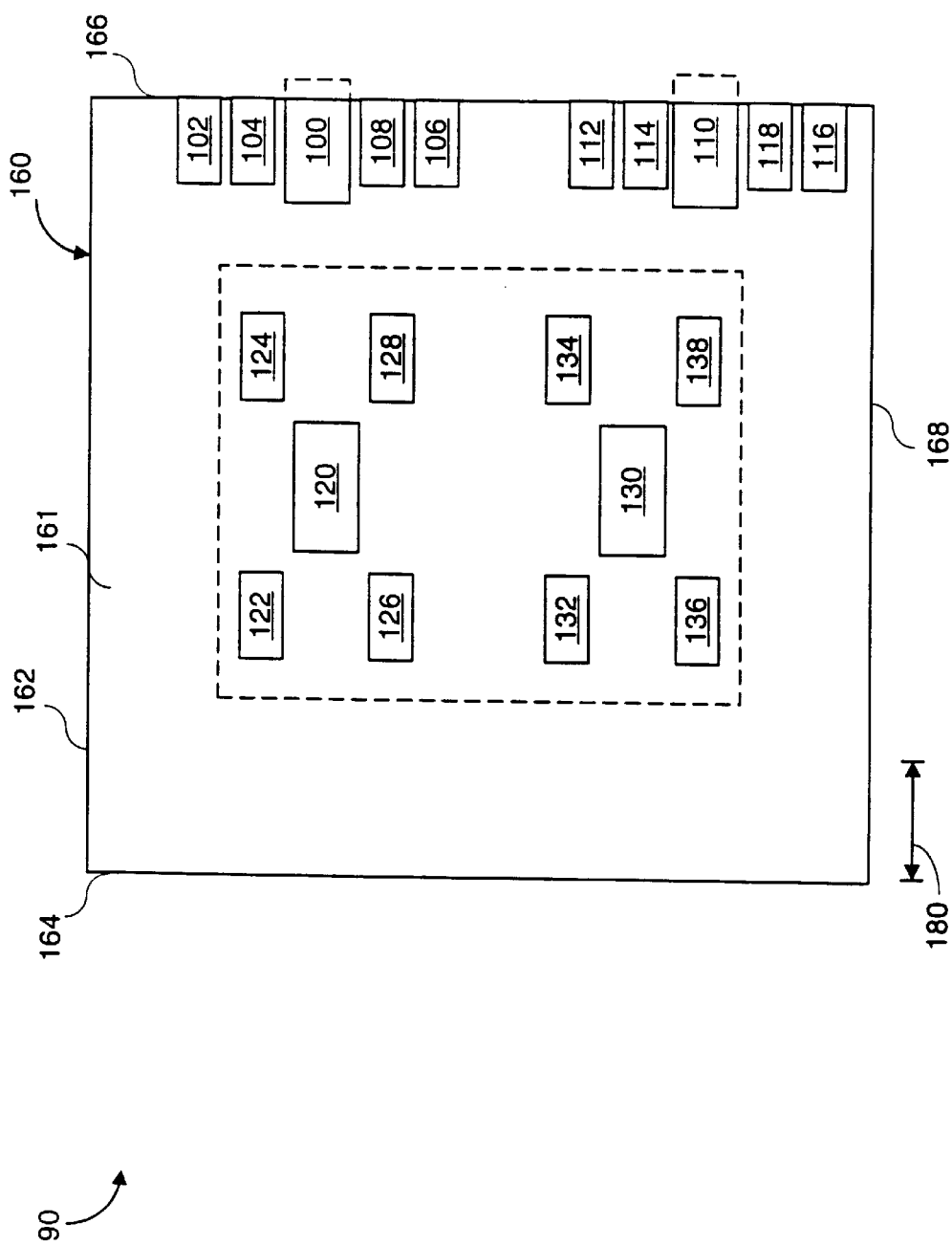
FIG. 2C is a block diagram of the objects of FIG. 2A displayed in the window of FIG. 2A shifted left according to one embodiment of the present invention.

In some display instances, objects will bunch up around the edges which causes conflicts for space in the outer portion 161 of the window 160. Referring now to FIG. 2C, a window 160 moved such that the leftmost objects 120, 122, 124, 126, 128, 130, 132, 134, 136, 138 are near the center of the window 160, and the remaining objects 100, 102, 104, 106, 108, 110, 112, 114, 116, 118, 140, 142, 144, 146, 148, 150, 152, 154, 156, 158 are in the outer portion 161 of the window 160 near the right border 166 to indicate their original position to the right of the centered objects 120, 122, 124, 126, 128, 130, 132, 134, 136, 138. In one embodiment, certain objects 100, 102, 104, 106, 108, 110, 112, 114, 116, 118 that are closer to the objects 120, 122, 124, 126, 128, 130, 132, 134, 136, 138 that are displayed away from the borders 162, 164, 166, 168 of the window 160 are displayed "over" objects 140, 142, 144, 146, 148, 150, 152, 154, 156, 158 that are further away from such objects 120, 122, 124, 126, 128, 130, 132, 134, 136, 138, causing objects 140, 142, 144, 146, 148, 150, 152, 154, 156, 158 not to be displayed, as they are not displayed in the Figure. In other embodiments, the set of objects 140, 142, 144, 146, 148, 150, 152, 154, 156, 158 are moved slightly up or down to take available space, such as the space between objects 106 and 112 and the space above object 102. In other embodiments, the "nearer" objects 100, 102, 104, 106, 108, 110, 112, 114, 116, 118 are moved slightly toward the center of the window 160 with portions of the underlying objects 140, 142, 144, 146, 148, 150, 152, 154, 156, 158 remaining visible so as to indicate the presence of these objects 140, 142, 144, 146, 148, 150, 152, 154, 156, 158.

In a three dimensional display, objects at higher levels are always displayed over objects at lower levels, with conflicting objects on the same level being displayed as described above.

Figure 3A:
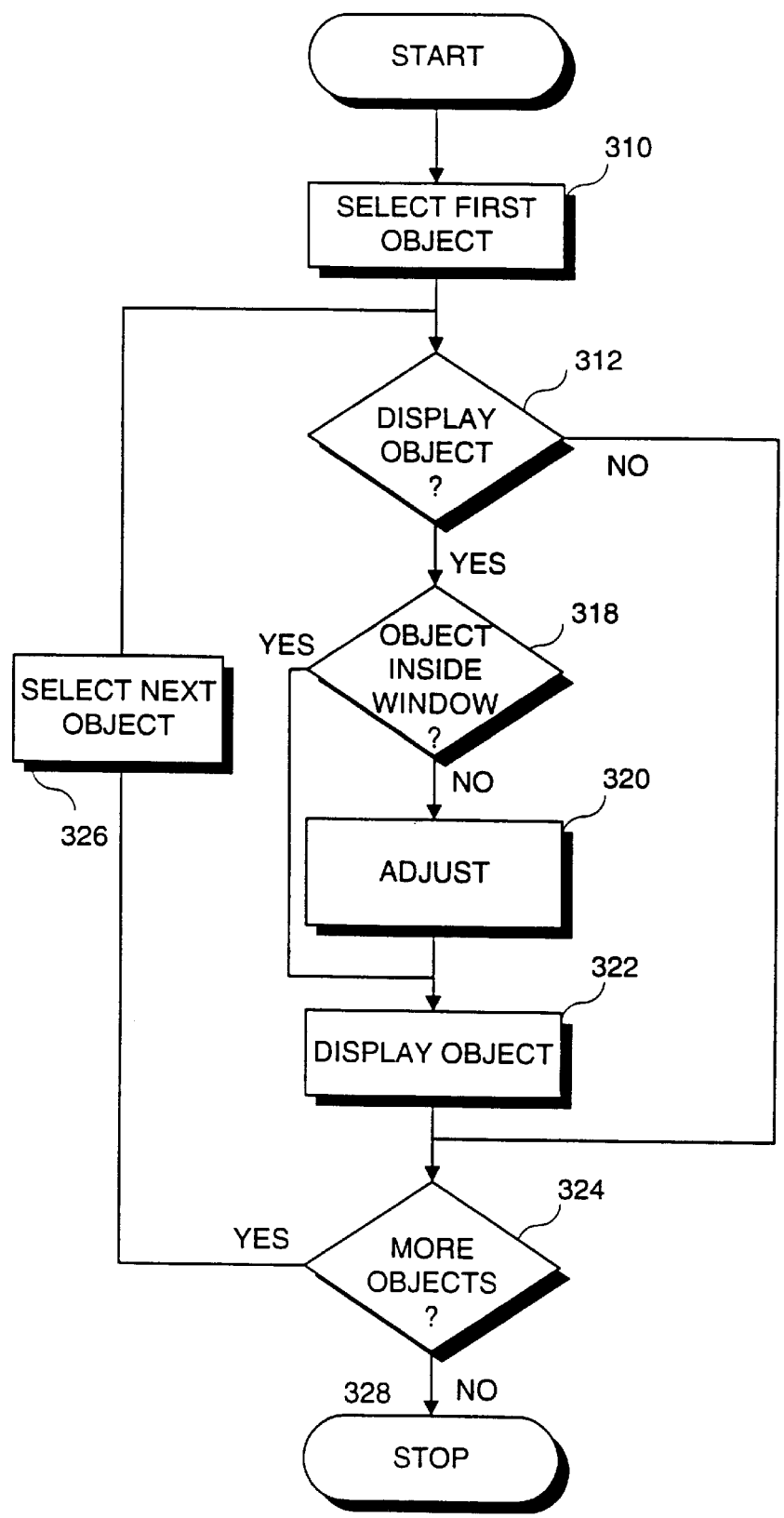
FIG. 3A is a flowchart illustrating a method of displaying objects according to one embodiment of the present invention.

Referring now to FIG. 3A, a method of displaying objects according to one embodiment of the present invention is shown. An object capable of display is selected 310. In one embodiment, the object is examined to determine whether to display the object 312. In one embodiment, any object capable of display is displayed and so step 312 is not performed. In another embodiment, only objects at a certain level or levels of a hierarchy are displayed. This selection process can act as a filter in a hierarchical arrangement of objects where displaying all objects capable of being displayed would overly clutter the display. In one embodiment, the number of levels of objects to be displayed is user selectable and the objects selected for display are that number of objects in "front" of the user as described above. Referring momentarily to FIG. 2, only objects on two levels are displayed, with objects on other levels not displayed.

If the object selected is to be displayed, it is examined to determine whether its present position is within the borders of the window 318. In one embodiment, each object and contains a position identifier which describes its position. The position identifier uses a two—coordinate pair system such as a pixel coordinate system having an x and a y coordinate describing the number of pixels from the upper left corner of the universe of objects, with (0,0) representing the upper leftmost pixel. Referring momentarily to FIG. 1A, the upper left hand corner of the object 122 would represent (0,0). The position identifier may be the two coordinate pairs identifying two diagonal corners of the smallest rectangle into which the object will fit where objects have different sizes, or any other position identifier which allows the outer boundary of each object to be identified or computed. Referring momentarily to FIG. 1B, in one embodiment, the window 160 is a rectangle, the borders 162, 164, 166, 168 of the window 160 may be described in the same fashion using the same coordinate system. An object may be identified as inside or outside the borders of the window 160 by comparing the four coordinates of the outer edge of the object with the corresponding coordinates of the borders 162, 164, 166, 168 of the window 160 according to its current size and position. For example, if the leftmost coordinate and rightmost coordinate of the objects are both between the left and right borders 164, 166 of the window 160, and the top and bottom coordinates of the object are similarly between the top and bottom borders 162, 168 of the window 160, the object is fully within the borders 162, 164, 166, 168 of the window 160. Otherwise, the object is at least partially outside the borders 162, 164, 166, 168 of the window 160.

Referring again to FIG. 3A, if the object is determined to be inside the window, it is displayed in a conventional fashion 322, for example by copying the object to an offscreen buffer which is then rendered by the display drivers and sent to a display via a display interface. If there are more objects to be displayed 324, another object is selected 326 and the method repeats at step 312 as shown in the figure. If there are no more objects to be displayed, the method terminates 328.

In one embodiment, the each of the available objects repeatedly cycle through the method so there are always "more" objects until the window is minimized or closed and so the termination step 328 is never executed until the window is minimized or closed.

In the event that an object is not inside the window at step 318, certain display characteristics, such as the position of the object, are first adjusted 320 for example to reposition the object within the window for display. In one embodiment, this adjustment is made only to the position of the object to allow the object to be displayed in its original size and shape within the window. In such embodiment, the one or two coordinates of the object outside the borders of the window are substituted with the corresponding coordinate of the window. The coordinate of the object representing the opposite side from the side adjusted is adjusted by the same amount so as to preserve the original size of the object.

This type of adjustment step 320 results in a position of the object that is inside the window, near the border of the window and near the original position of the object. Thus objects 130, 132, 134, 136, 138 are displayed in an adjusted position that is near the original positions of objects 130, 132, 134, 136, 138 of FIG. 1B. They are displayed in the lower left hand corner of window 160 to indicate that the original positions of objects 130, 132, 134, 136, 138 are near the lower right hand corner of window 160. Note that every object 130, 132, 134, 136, 138 having an original position outside the window 160 need not be displayed in the position immediately nearest its original position at the edge of the window 160 because of conflicts with other objects 130, 132, 134, 136, 138 which may be already be displayed there. For example, object 132 of FIG. 2 is blocked from being displayed nearest its original position of FIG. 1B by objects 130, 134 in FIG. 2. In one embodiment, objects blocked in this fashion are adjusted as little as possible while allowing them to be adjacent to one of the borders 162, 164, 166, 168 by attempting to move them up or down further and further until they no longer conflict with the space of another object on the same level, as in FIG. 2. The coordinates of each object displayed is stored in a table in order to assist in the determination. In another embodiment, such blocked objects 132 may be displayed slightly overlapped with, or adjacent to, the objects blocking them, for example by adjusting overlapping objects further toward the center of the window 160, with the objects with original positions furthest from the window 160 positioned nearest the borders 162, 164, 166, 168. In such embodiments, the positions of other objects already in the window may be stored in a table and the location of the object being located is checked against the objects in the table to see if the overlap that would result is acceptable, and if not, further adjustments must be made. In one embodiment, objects are adjusted in the order of their original positions relative to the center of the window 160 to provide a consistent conflict resolution.

In another embodiment, the adjustment is made to the position as well as the size or shape to allow the object to fit partially within the window 160, the remaining portion either being displayed outside the window or not displayed at all. In another embodiment, an adjusted object that is smaller in one or more dimensions than corresponding maximum measurements displayed in its original size and shape is displayed in its full size and original shape within the window, while adjusted objects larger than the maximum measurements are displayed within the window in a different size or shape that does not exceed the maximum measurement or displayed in its original size and shape with a portion of the object in the window and a portion displayed outside the window so that the object appears to "overlap" the border of the window.

Referring momentarily to FIG. 2, objects 122, 124, 126, 128, 132, 134, 136, 138 are smaller in a side to side dimension than maximum measurement 180 and are therefore fully displayed within the window 160, but objects 120, 130 are wider than maximum dimension 180 and are therefore only partially displayed within the window, with portions 121, 131 either displayed outside the window or not displayed.

Referring again to FIG. 3A, in one embodiment, the adjustment step 320 is performed in a manner that does not erase the original characteristics of the object, allowing the characteristics such as the position of the objects to be retrieved and processed at a later time based on their original positions prior to adjustment step 320. In one embodiment, each object contains its original characteristics and its adjusted characteristics, so that the original characteristics are not lost after adjustment 320. In another embodiment, the adjusted characteristics are not stored with the object, but immediately used to display the object, so that the original characteristics are unaffected. In another embodiment, the method of FIG. 3A operates on a copy of the object, preserving the original characteristics of the object for use in subsequent execution of the method shown in FIG. 3A.

Figure 3B:
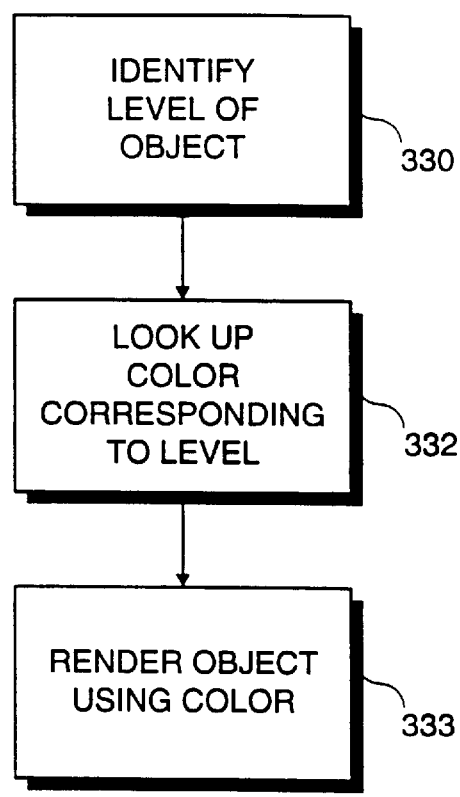
FIG. 3B is a flowchart illustrating the display of an object according to the level of the object in a hierarchy according to one embodiment of the present invention.

Other characteristics besides the location, size and shape of the objects that are adjusted 320 to fit within the window may be adjusted so as to distinguish between objects which are displayed in the "outer locations" of the window, that is, inside the window near the borders of the window, before adjustment from those which are displayed in the outer locations of the window after adjustment. In one embodiment, such objects are displayed at a different display intensity, e.g. more dimly, than objects having positions that are not adjusted. In another embodiment, objects that have been adjusted are displayed in a color that is different from objects that are not adjusted.

Where objects have a hierarchical arrangement, the display step 322 may involve displaying the object according to the objects level in the hierarchy. Referring now to FIG. 3B, a method of displaying an object according to the level of the object in the hierarchy according to one embodiment of the present invention is shown. The level of the object within the hierarchy is identified 330. In one embodiment, each object contains its own level, allowing it to be identified by querying the object. The display color of objects at that level in the hierarchy is looked up 332, for example by using a table look up of user selectable colors for each level in the hierarchy. In one embodiment, objects at only a few levels of the hierarchy are displayed at any one time, allowing the colors used for each level to be reused for other levels in the hierarchy. For example, the look up table may specify that objects at level one use blue, objects at level two use green and objects at level three use red. If there are more than three objects, the color selected is the level of the object in the hierarchy modulus three, meaning objects at level four use blue, and so on. The object may then be rendered in the color corresponding to its level in the hierarchy 333.

Figure 4:
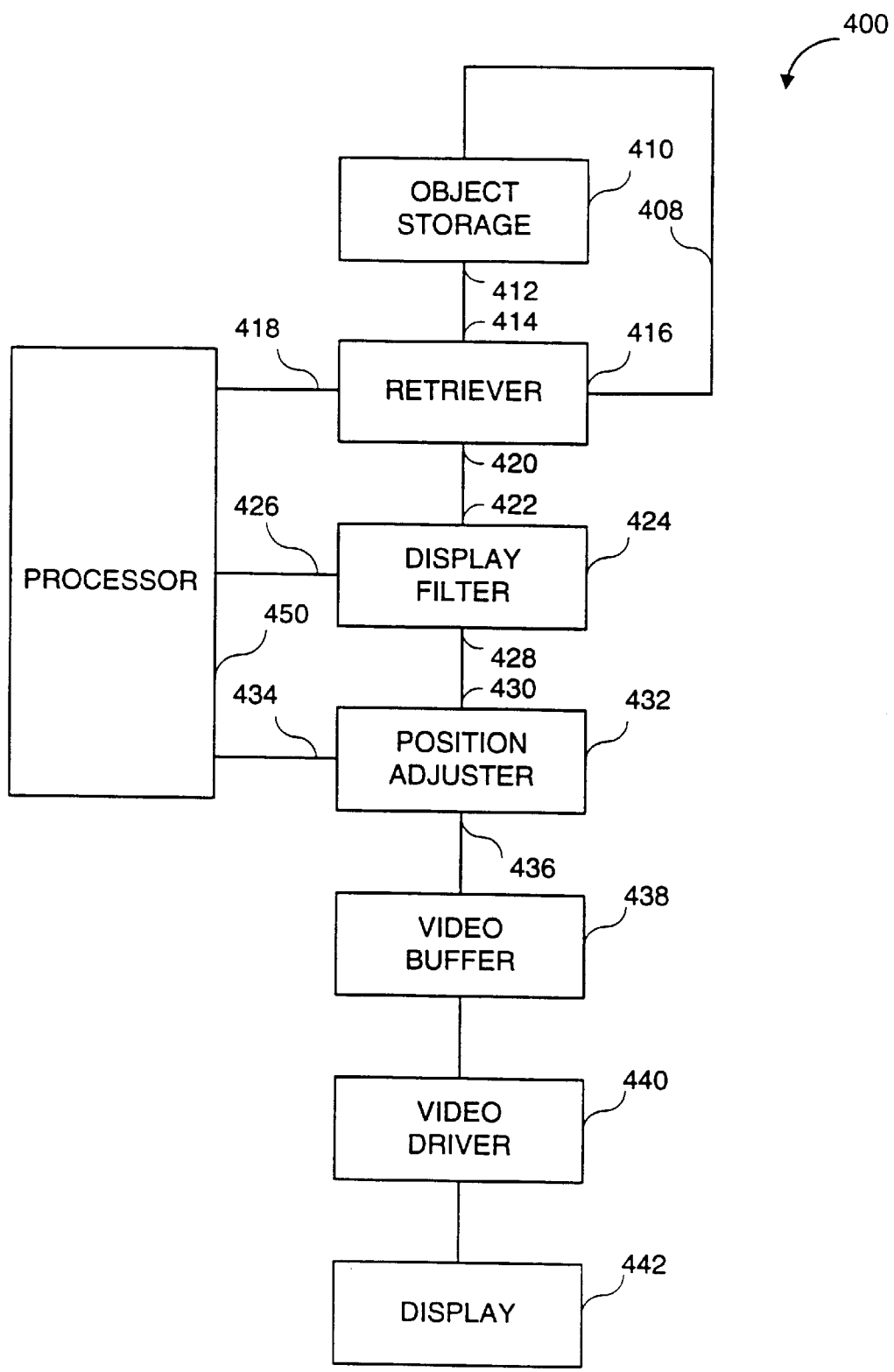
FIG. 4 is a block schematic diagram of an apparatus for displaying objects using a window according to one embodiment of the present invention.

Referring now to FIG. 4, an apparatus 400 for displaying objects according to one embodiment of the present invention is shown. Objects are stored in an addressable object storage device 410 such as a memory or a hard disk. In one embodiment, objects include a set of characteristics such as coordinate pairs describing the position of the object, and may include other display characteristics such as color, size, shape and intensity as well. In one embodiment, some of the characteristics are calculated only for the levels currently visible. The object output 412 of storage device 410 is coupled to the input 414 of retriever 416. Retriever 416 retrieves one or more objects from the object storage 410 using address lines 408 to identify the objects to be retrieved from storage device 410. Retriever 416 may retrieve each of the objects once until the prompted to repeat the retrieval cycle based on a signal received at optional input 418 coupled to output of processor 450 which signals that the cycle is to be repeated because, for example, the window in which the objects are to be displayed has been moved relative to the objects or resized. Alternately, retriever 416 may periodically re-retrieve each of the objects in object storage 410 so that objects are retrieved and processed as described herein in an endless cycle. The output 420 of the retriever 416 is coupled to the input 422 of optional display filter 424. Optional display filter 424 identifies whether the object or objects retrieved by retriever 416 are to be displayed according to criteria received by display filter input 426 from output of processor 450. In one embodiment, each object contains its level in a hierarchy as described above, and one or more criteria indicators corresponding to the levels corresponding to objects which are to be displayed are accepted by filter input 426. Display filter 424 passes objects that meet the criteria to be displayed to its output 428, but does not pass objects which are not to be displayed.

Position adjuster 432 has an input 430 coupled to output 428 of display filter 424 and identifies whether the object or objects it receives at its input 430 are within the borders of the window, which are identified by coordinates or other position identifiers received at window coordinate input 434 from output of processor 450. If the object is within the borders of the window, position adjuster 432 passes the object to conventional video buffer 438 for display on conventional display 442 via conventional video driver 440. If the object is outside or partially outside the window, position adjuster adjusts display characteristics of the object such as the coordinates, size, shape, color or display intensity of the object or objects received at input 430 to cause the object to be fully or partially positioned within the borders of the window as described above with reference to FIG. 3A, prior to copying via output 436 the object with the adjusted coordinates to conventional video buffer 438 for display on conventional display 442 via conventional video driver 440. Because position adjuster 432 only alters the coordinates of the copy it receives via input 430 of the object stored in object storage 410, the original coordinates of the object stored in object storage 410 are unchanged, so that the apparatus 400 may repeat the procedure described herein when the window is moved or resized without separately undertaking the preservation of the original characteristics of the object stored in object storage 410.

Figure 5A:
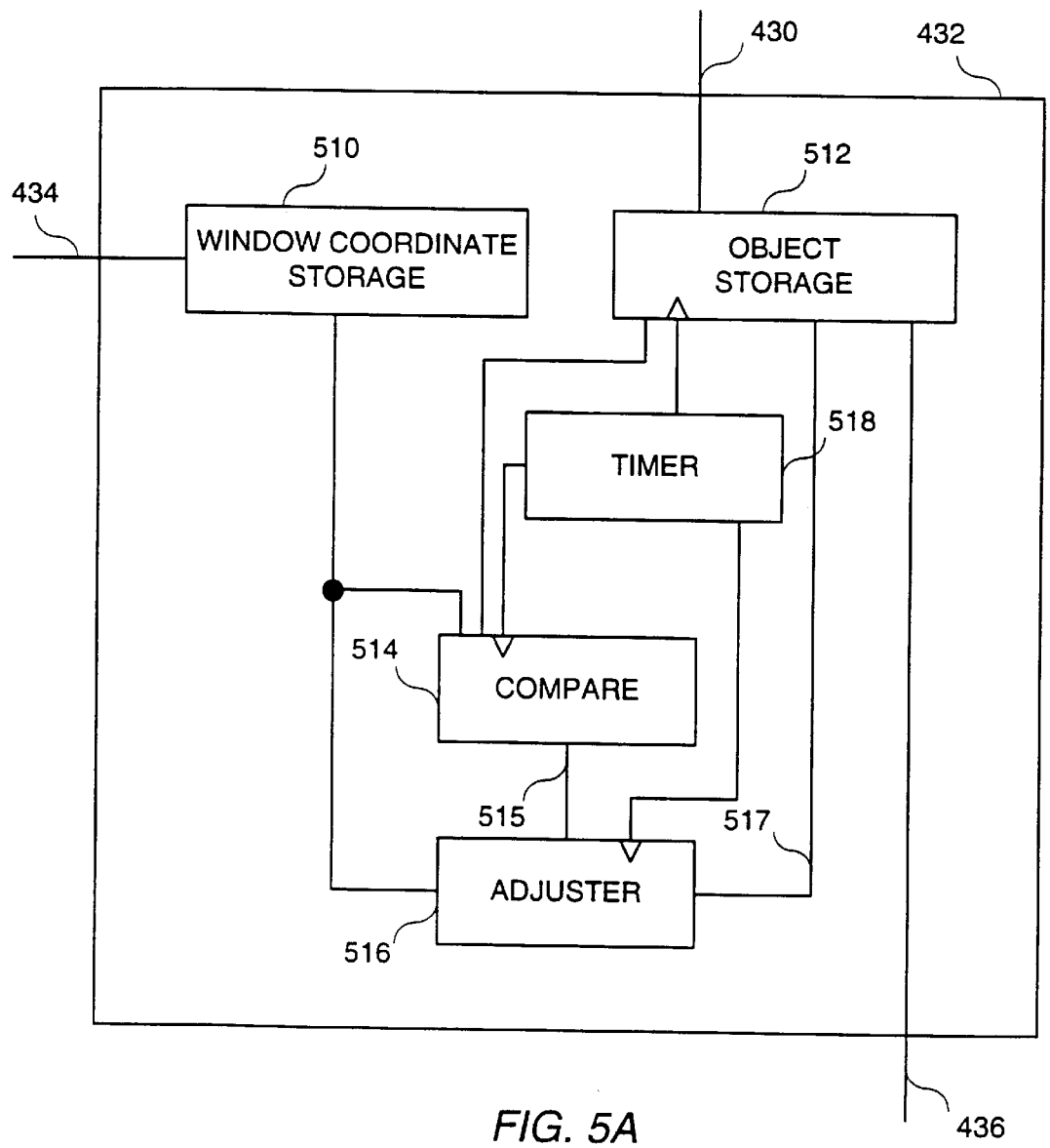
FIG. 5A is a block schematic diagram of a position adjuster shown in FIG. 4 according to one embodiment of the present invention.

Referring now to FIG. 5A, one embodiment of a position adjuster 432 of FIG. 4 is shown. Window coordinates are input via input 434 to window coordinate storage 510 which stores the window coordinates, such as the two coordinate pairs described above, to allow position adjuster 432 to identify the size and location of the window. Optional object storage 512 accepts object information including characteristics such as the coordinates and optionally, the size of the object via input 430. Comparator 514 has one input coupled to window coordinate storage 510 and another input coupled to object storage 512, and compares the size and position of the object to the coordinates of the window to determine whether the coordinates and size of the object are such that the object will not be displayed fully within the window without adjustment. In this case, output 515 signals adjuster 516 to adjust the one or more of the characteristics such as the coordinates, color, display intensity, size or shape of the object so that it will be displayed either fully or partially within the window as described above with reference to FIG. 3A. If so signaled by line 515, adjuster 516 computes the new position coordinates, size, shape or other characteristics of the object and writes them via line 517 in place of the values stored in object storage 512 or transfers the new values or original values directly to output 436 depending on the signal 515 received from comparator 514. Object store then writes the object to output 436. Optional timer 518 controls the timing of the comparator 514, adjuster 516 and object storage 512 so that the compare occurs first, any adjustment occurs next, and object storage 512 writes to output 436 last.

Figure 5B:
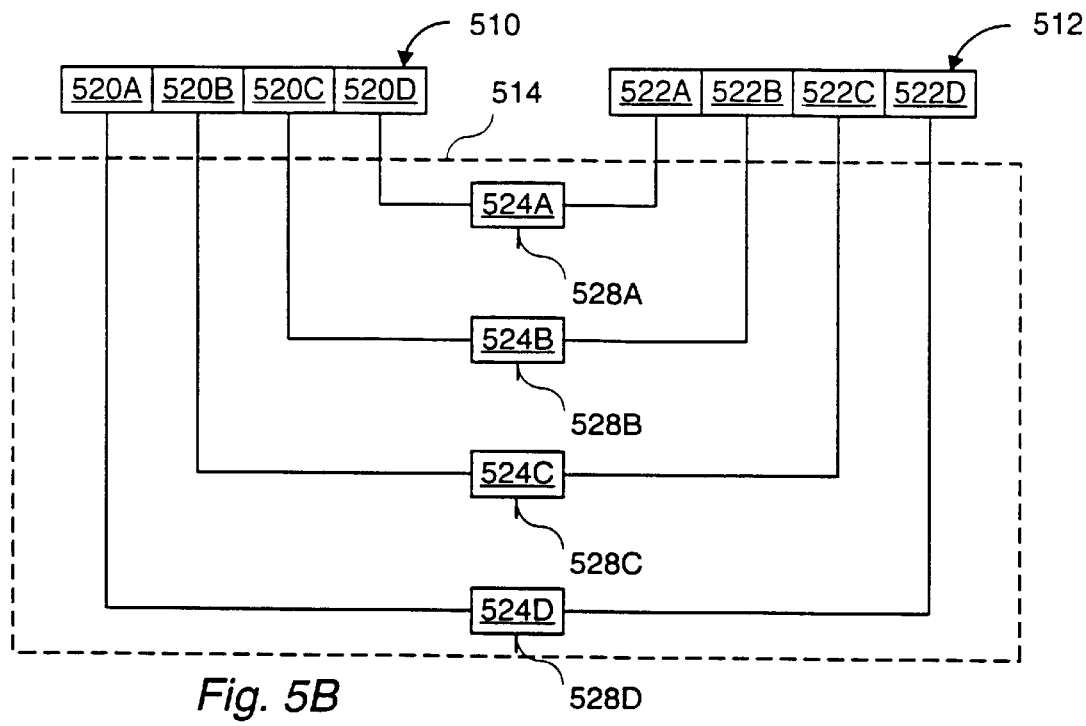
FIG. 5B is a block schematic diagram of the compare shown in FIG. 5A according to one embodiment of the present invention.

Referring now to FIG. 5B, the comparator 514 of FIG. 5A is shown in more detail according to one embodiment of the present invention. In one embodiment, the window is always in the shape of a rectangle defined by two coordinate pairs, and each object is identified by the two coordinate pairs corresponding to the position and size of the smallest rectangle that would contain the object. Window coordinate storage 510 stores in storage devices 520A, 520B, 520C, 520D the two display coordinate pairs from each of the two opposite corners of the window described above with reference to FIG. 3A. Object storage 512 stores in storage devices 522A, 522B, 522C, 522D the two display coordinates from each of the two opposite corners of the smallest rectangle that surrounds the displayed object. Comparator 514 contains comparators 524A, 524B, 524C, 524D coupled to each of the corresponding coordinates 520A, 520B, 520C, 520D, 522A, 522B, 522C, 522D so that they signal the same logic level if the leftmost display coordinate of the object is greater than the leftmost display coordinate of the window, the rightmost display coordinate of the object is less than the rightmost display coordinate of the window, the topmost display coordinate of the object is greater than the topmost display coordinate of the window, and the bottommost display coordinate of the object is less than the bottommost display coordinate of the window. The outputs 528A, 528B, 528C, 528D of each comparator 524A, 524B, 524C, 524D are the output 515 of comparator 514 shown in FIG. 5A.

Figure 5C:
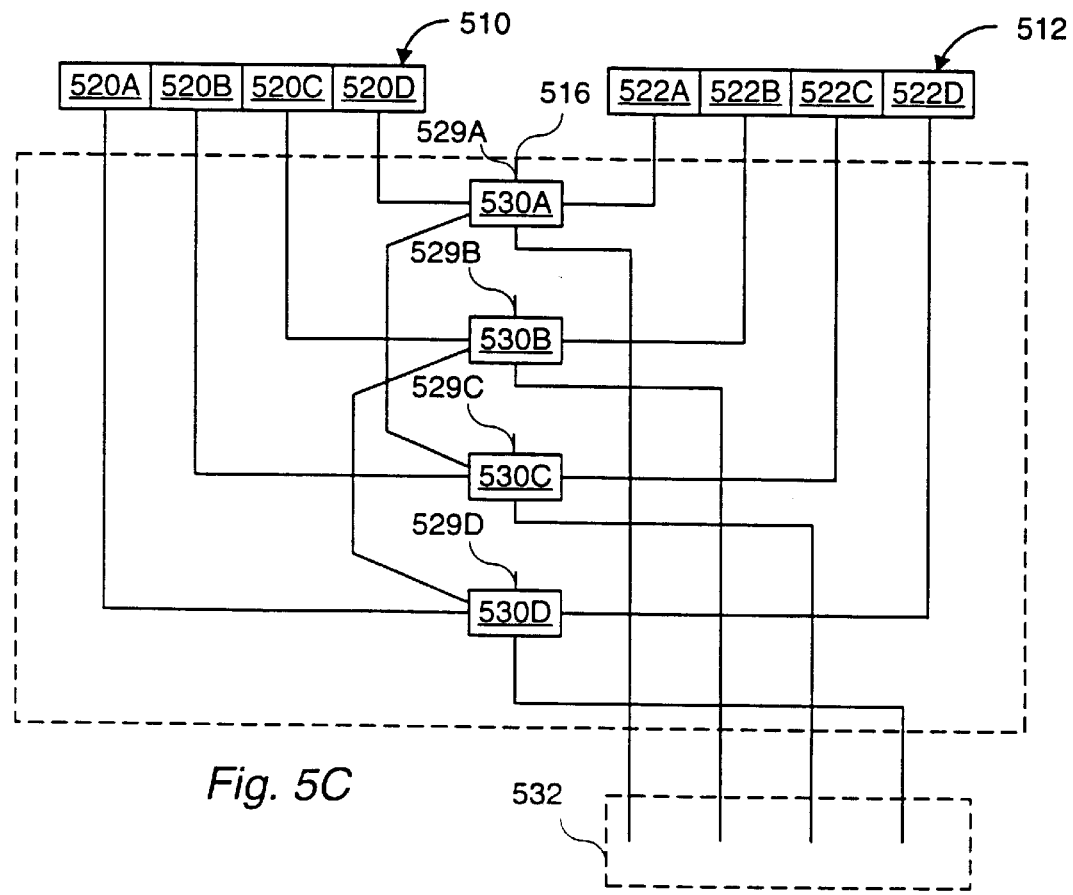
FIG. 5C is a block schematic diagram of the adjuster shown in FIG. 5A according to one embodiment of the present invention.

Referring now to FIG. 5C, the adjuster 516 of FIG. 5A is shown in more detail according to one embodiment of the present invention. Window coordinate storage 510 and object storage 512 are arranged as described above with respect to FIG. 5B. Computational units 530A, 530B, 530C, 530D have inputs 529A, 529B, 529C, 529D, which are respectively coupled to outputs 528A, 528B, 528C, 528D of the comparator 514 FIG. 5B. Multiplexors within computational units 530A, 530B, 530C, 530D select the original coordinate of the object if that coordinate is within the window, and the corresponding border coordinate of the window if the coordinate of the object is outside the window, and the difference between the original coordinate of the object and the coordinate of the window is computed and sent to the computational units 530A, 530B, 530C, 530D corresponding to the opposite side of the object (i.e. left is opposite right, top is opposite bottom) to allow for a similar adjustment of the opposite side to preserve the size and shape of the object. In another embodiment, the coordinate of the side originally outside the window is also communicated to computational unit 530A, 530B, 530C, 530D of the opposite side to allow the computational unit 530A, 530B, 530C, 530D of the opposite side to adjust the coordinate of the opposite side so as to adjust the dimension of the object between the two opposite sides if such dimension exceeds a certain maximum size.

Figure 5D:
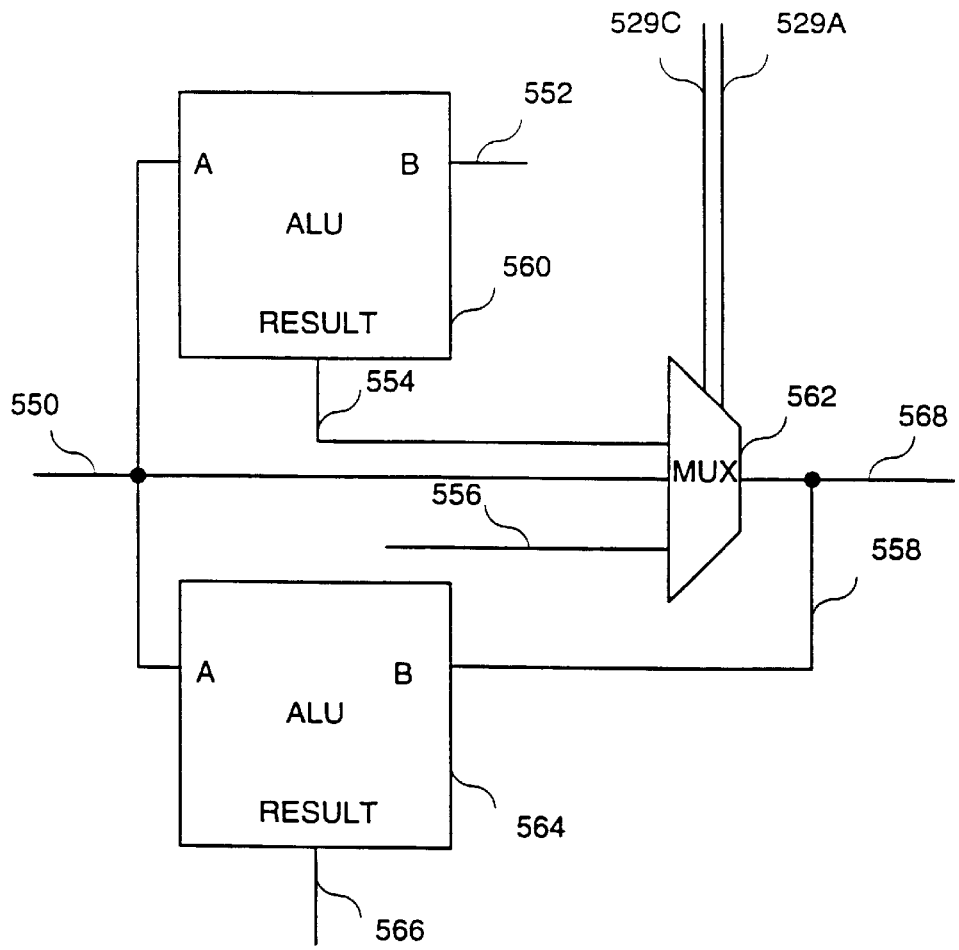
FIG. 5D is a block schematic diagram of a computational unit of FIG. 5C according to one embodiment of the present invention.

Referring now to FIGS. 5C and 5D, one embodiment of a computational unit 530A of FIG. 5C according to the present invention is shown. Multiplexor 562 selects as the output 568 coupled to the corresponding output 532, the coordinate of the object at input 550 when the condition of no adjustment is required, the corresponding coordinate of the window at input 556 when the condition of adjustment to the edge of the window is required, or the adjusted coordinate of the object computed by Arithmetic Logic Unit (ALU) 560 corresponding to the sum of the coordinate of the object at input 550 and the difference of the opposite side of the object at input 552 when the condition of the coordinate requiring adjustment in response to an adjustment of the coordinate of the opposite side of the object. The conditions (no adjustment, adjust to edge of window, or adjust in response to adjustment of opposite side) are identified by the selection inputs 529A, 529C both inactive, 529A active and 529C inactive, or 529A inactive and 529C active, respectively. ALU 564 computes the difference of the object coordinate at its A input and the output 568 of multiplexor 562 to provide as opposite side difference input 552 of computational unit 530C.

Figure 5E:
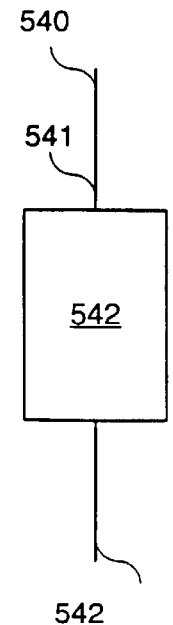
FIG. 5E is a block schematic diagram of an apparatus for providing a color of an object according to the level in a hierarchy of the object according to one embodiment of the present invention.

Referring now to FIG. 5E, one embodiment of an apparatus which assigns a color to an object according to the level of the object in a hierarchy is shown. The apparatus in the Figure may be used prior to the object input into the apparatus of FIG. 5A In one embodiment, eight colors are each assigned a unique number 0 to 7 and hierarchy levels are assigned a color according to their level in the hierarchy mod 8. Hierarchy input 540 accepts the least significant three bits of the binary number representing the hierarchy of the object and passes the bits to an address input 541 of an 8×8 memory 542. The colors for each level are stored in each memory location at the address corresponding to the input. Data output 543 of memory 542 passes a color code which may be copied into the offscreen buffer at the bit locations corresponding to the object by conventional rendering devices.

Figure 6:
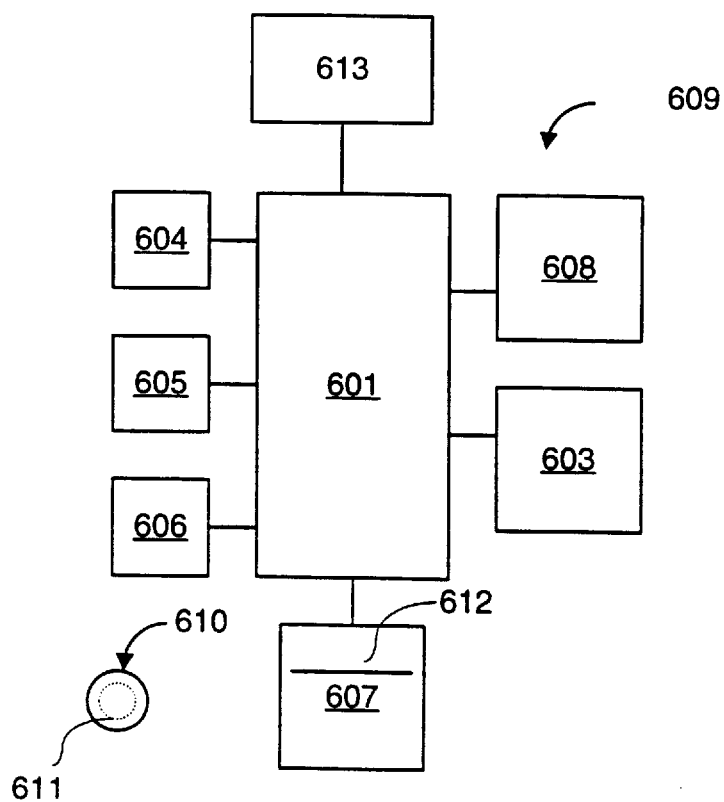
FIG. 6 is a block schematic diagram of a conventional computer system and a computer program product.

The apparatus or methods of the present invention described above may be implemented in software on a conventional computer system in a preferred embodiment. As shown in FIG. 6, a conventional computer system 609 includes a processor 601 coupled to a first storage device 603 such as a memory, and a second storage device 608 such as a disk storage system. A user may interact with the system via a keyboard 604, mouse 605 and a display 606. Computer program product reader 607, such as a memory, hard drive, floppy disk drive or CD-ROM drive can is coupled to processor 601 to allow computer readable program code devices 611 such as encoded bits of a computer program product 610 such as a memory, hard disk, floppy disk, CD-ROM or other storage device to be read and their contents input to processor 601 and stored in memory 603 and/or disk storage 608 for use in controlling the operation of the computer system 609 when computer program product 610 is inserted into slot 612 of computer program product reader 667 or when computer program product 610 is otherwise activated. Communication interface 613 such as a modem may also be coupled to processor 601 to allow for remote retrieval of computer readable program code devices for storage on memory 603 or disk storage 608. An operating system is loaded into memory 603 or disk storage 608 or a combination of memory 603 and disk storage 608 and instructs processor 601 to load and execute computer program products from computer program product 610 or other storage devices 603, 608 comprising applications such as those which display objects as described above. Many conventional applications are distributed on computer program products 610, such as diskettes, storage devices such as ROMs or disk storage systems, each containing computer readable code devices 611 which cause the computer system 609 to operate in a particular manner such as is described herein when a copy of the code devices is loaded into the computer system 609.

In one embodiment, the methods and apparati described herein are implemented in software and copied and distributed on a computer program product to operate on a conventional computer system such as the computer system 609 shown in FIG. 6.

What is claimed is:

1. A method for displaying, in a window comprising
   an outer area and an inner area, each area being located within the window and having a plurality of locations, at least one object in a plurality of objects, each object having an original position, the method comprising:
   a. selecting one of the objects;
   b. determining whether the selected object has an original position outside the window;
   c. responsive to the selected object having an original position outside the window, selecting a location in the outer area of the window;
   d. responsive to the selected object having an original position inside the window, selecting a location in the inner area of the window; and
   e. displaying the selected object at the window location selected.

2. The method of claim 1 wherein the window has at least one position identifier and step b; comprises comparing at least one position identifier of the selected object with at least one position identifier of the window.

3. The method of claim 2 comprising the additional steps of:

f. selecting as the selected object at least one of the objects different from the object selected in step a; and g. repeating steps b–e.

4. The method of claim 3 comprising the additional step of:

h. repeating steps f–g for each object in the plurality that was not selected in steps a and f.

5. The method of claim 3 wherein each object has an original size, the method additionally comprising:

responsive to the selected object having an original position outside the window, comparing the size of the selected object with a predetermined size;

responsive to the size of the selected object exceeding the predetermined size, selecting a size corresponding to the predetermined size; and responsive to the size of the selected object not exceeding the predetermined size, selecting the original size of the selected object; and wherein the displaying step comprises displaying the selected object at the selected size.

6. The method of claim 5 wherein the characteristics of the objects additionally comprise at least one selected from an original shape, an original color and an original intensity, the method additionally comprising:

responsive to the selected object having a original position outside the window, selecting at least one characteristic selected from a new shape different from the original shape, a new color different from the original color and a new intensity different from the original intensity; and responsive to the selected object having an original position inside the window, selecting at least one characteristic selected from the original shape, the original color and the original intensity; and wherein the displaying step comprises displaying the object using at least one characteristic selected from the shape, color and intensity selected.

7. The method of claim 3 wherein selecting a location in the outer area of the window comprises selecting a location in the outer area of the window nearer to the original position of the object than most of the locations in the outer area of the window.

8. The method of claim 7 wherein selecting a location in the outer area of the window additionally comprises:

determining whether the selected location corresponds to another object; and responsive to the selected location corresponding to another object, selecting another location in the outer area of the window.

9. The method of claim 1 wherein at least one of the objects in the plurality has a level in a hierarchy, and wherein step e comprises:

determining the level in the hierarchy of the object; and rendering the object in a color responsive to the determined level in the hierarchy.

10. An apparatus for preparing for display, in a window having a position and comprising an outer area and an inner area, each area being located within the window and having a plurality of locations, at least one object in a plurality of objects, each object having an original position described by a position identifier, the apparatus comprising:

at least one window coordinate input corresponding to the position of the window;

a position adjuster having:

a window coordinate input coupled to the apparatus window coordinate input;

an object position identifier input coupled to receive the original position identifier of the object; and an output selectively providing the position identifier received at the object position identifier input responsive to the original position of the object fully inside the window described by the window coordinate input, and an identifier corresponding to a location in the outer area of the window responsive to the original position of the object at least partially outside the window; and a position output coupled to the position identifier output.

11. The apparatus of claim 10 wherein the position of the window comprises at least one coordinate describing at least a part of the position of the window and the position adjuster additionally comprises a comparator comprising:

a window input coupled to the position adjuster window coordinate input;

an object input coupled to the object position identifier input; and at least one comparator having:

a first input coupled to the window input to receive one of the window coordinates;

a second input coupled to the object input to receive one of the object position identifiers corresponding to the window coordinate received at the first input; and a first output coupled to at least one comparator output having a first state responsive to the object position identifier at the second input having a value indicating a position inside the window described by the window coordinate at the first input and a second state responsive to the object position identifier at the second input having a value not indicating a position inside the window described by the window coordinate at the first input.

12. The apparatus of claim 10 wherein each of the objects additionally has an address, the apparatus additionally comprising:

an addressable object storage having an address input and an output for storing the plurality of objects at a plurality of addressable locations and providing at least one of the objects to the output responsive to the address of the at least one object presented at the address input; and a retriever having an input coupled to the object storage output for retrieving at least one of the plurality of objects from the object storage and presenting said object and an output coupled to the object position identifier input of the position adjuster.

13. The apparatus of claim 10 additionally comprising a display filter having an input coupled to the retriever output for accepting at least one object characteristic, a criteria input for accepting at least one criteria and an output coupled to the object position identifier input of the position adjuster for providing at least a portion of the object characteristics received at the input responsive to the criteria input.

14. The apparatus of claim 10 wherein at least one of the objects additionally has at least one display characteristic selected from size, shape, color and brightness and the position adjuster is additionally for selectively substituting for objects identified as having a position identifier describing a display position at least partially outside the window, and presenting at its output, at least one display characteristic selected from size, shape, color and brightness different from said display characteristic received at the input.

15. The apparatus of claim 10 wherein a plurality of the objects have a hierarchical level indicator, wherein the apparatus additionally comprises a hierarchical level color selector comprising an input coupled to receive at least a portion of the hierarchical level indicator of the object and an output providing a color indicator responsive to the input.

16. An apparatus for preparing for display, in a window having a position and comprising an outer area and an inner area, each area being located within the window and having a plurality of locations, at least one object in a plurality of objects, each object having an original position described by a position identifier, wherein the position of the window comprises at least one coordinate describing at least a part of the position of the window, the apparatus comprising:

at least one window coordinate input corresponding to the position of the window;
a position adjuster having:
  a window coordinate input coupled to the apparatus window coordinate input;
  an object position identifier input coupled to receive the original position identifier of the object; and
  an output selectively providing the position identifier received at the object position identifier input responsive to the original position of the object fully inside the window described by the window coordinate input, and an identifier corresponding to a location in the outer area of the window responsive to the original position of the object at least partially outside the window; and
a comparator comprising:
  a window input coupled to the position adjuster window coordinate input;
  an object input coupled to the object position identifier input; and
  at least one comparator having:
    a first input coupled to the window input to receive one of the window coordinates; and
    a second input coupled to the object input to receive one of the object position identifiers corresponding to the window coordinate received at the first input; and
a position output coupled to the position identifier output;
a window input coupled to the position adjuster window coordinate input;
an object input coupled to the object position identifier input; and
at least one comparator having:
  a first input coupled to the window input to receive one of the window coordinates; and
  a second input coupled to the object input to receive one of the object position identifiers corresponding to the window coordinate received at the first input; and
  a first output coupled to at least one comparator output having a first state responsive to the object position identifier at the second input having a value indicating a position inside the window described by the window coordinate at the first input and a second state responsive to the object position identifier at the second input having a value not indicating a position inside the window described by the window coordinate at the first input;

wherein the position identifiers comprise a plurality of coordinates and the position adjuster additionally comprises an adjuster comprising:
  a window input coupled to the window coordinate input;
  an object input coupled to the object position identifier input; and
  a plurality of computational units, each having:
    a first input coupled to the position adjuster window input to receive one of the window coordinates;
    as a second input coupled to the position adjuster object input to receive one of the object coordinates corresponding to the window coordinate received at the first input;
    a third input having a first state and a second state coupled to one of the comparator outputs;
    a fourth input;
    a first output coupled to the fourth input of another computational unit corresponding to an opposite border of the window to provide a number substantially equal to a difference between the first and second computational units; and
  at least one output coupled to the position adjuster output for providing a coordinate substantially equal to:
    the coordinate received at the second input mathematically combined using an operator selected from addition or subtraction with the fourth input responsive to the third input in the first state; and
    the coordinate received at the first input responsive to the third input in the second state.

17. A computer program product comprising a computer usable medium having computer readable code embodied therein for displaying, in a window comprising an outer area and an inner area, each area being located within the window and having a plurality of locations, at least one object in a plurality of objects, each object having an original position, the computer program product comprising:

a. computer readable program code devices configured to cause a computer to select one of the objects;

b. computer readable program code devices configured to cause a computer to determine whether the selected object has an original position outside the window;

c. computer readable program code devices configured to cause a computer to select a location in the outer area of the window responsive to the selected object having an original position outside the window;

d. computer readable program code devices configured to cause a computer to select a location in the inner area of the window responsive to the selected object having an original position inside the window; and e. computer readable program code devices configured to cause a computer to display the selected object at the window location selected.

18. The computer program product of claim 17 wherein the window has at least one position identifier and the computer readable program code devices configured to cause the computer to determine whether the selected object has an original position outside the window comprise computer readable program code devices configured to cause the computer to compare at least one position identifier of the selected object with at least one position identifier of the window.

19. The computer program product of claim 18 additionally comprising:

f. computer readable program code devices configured to cause the computer to select as the selected object at least one of the objects different from the object selected by computer readable program code devices a; and g. computer readable program code devices configured to cause the computer to execute computer readable program code devices b–e.

20. The computer program product of claim 19 wherein each object has an original size, the computer program product additionally comprising:

computer readable program code devices configured to cause the computer to compare the size of the selected object with a predetermined size responsive to the selected object having an original position outside the window;

computer readable program code devices configured to cause the computer to select a size corresponding the predetermined size responsive to the size of the selected object exceeding the predetermined size;

computer readable program code devices configured to cause the computer to select the original size of the selected object responsive to the size of the selected object not exceeding the predetermined size; and wherein the computer readable program code devices configured to cause the computer to display comprise computer readable program code devices configured to cause the computer to display the selected object at the size selected size.

21. The computer program product of claim 20 wherein the characteristics of the objects additionally comprise at least one selected from an original shape, an original color and an original intensity, the computer program product additionally comprising:

computer readable program code devices configured to cause the computer to select at least one characteristic selected from a new shape different from the original shape, a new color different from the original color and a new intensity different from the original intensity responsive to the selected object having an original position outside the window, and wherein the computer readable program code devices configured to cause the computer to display comprise computer readable program code devices configured to cause the computer to display the object corresponding to at least one characteristic selected from the shape, color and intensity selected.

22. The computer program product of claim 19 wherein the computer readable program code devices configured to cause the computer to select a location in the outer area of the window comprises computer readable program code devices configured to cause the computer to select a location in the outer area of the window nearer to the original position of the object than most of the locations in the outer area of the window.

23. The computer program product of claim 19 wherein the computer readable program code devices configured to cause the computer to select a location in the outer area of the window additionally comprises:

computer readable program code devices configured to cause the computer to determine whether the selected location corresponds to another object; and computer readable program code devices configured to cause the computer to select another location in the outer area of the window responsive to the selected location corresponding to another object.

24. The computer program product of claim 18 additionally comprising:

h. computer readable program code devices configured to cause the computer to execute computer readable program code devices f–g for each object in the plurality that was not selected by computer readable program code devices a and f.

25. The computer program product of claim 17 wherein at least one of the objects in the plurality has a level in a hierarchy, and the computer readable program code devices configured to cause the computer to display the object comprises:

computer readable program code devices configured to cause the computer to identify the level in the hierarchy of the object; and computer readable program code devices configured to cause the computer to render the object in a color responsive to the level in the hierarchy identified.

26. An apparatus for displaying, in a window comprising an outer area and an inner area, each area being located within the window and having a plurality of locations, at least one object in a plurality of objects, each object having an original position, the apparatus comprising:

a. means for selecting one of the objects;

b. means for determining whether the selected object has an original position outside the window;

c. means for selecting a location in the outer area of the window responsive to the selected object having an original position outside the window;

d. means for selecting a location in the inner area of the window responsive to the selected object having an original position inside the window; and e. means for displaying the selected object at the window location selected.

27. The apparatus of claim 26 wherein the window has at least one position identifier and the means for determining comprises means for comparing at least one position identifier of the selected object with at least one position identifier of the window.

28. The apparatus of claim 27 additionally comprising:

f. means for selecting as the selected object at least one of the objects different from the object selected in step a.

29. The apparatus of claim 28 wherein the means for selecting a location in the outer area of the window comprises means for selecting a location in the outer area of the window nearer to the original position of the object than most of the locations in the outer area of the window.

30. The apparatus of claim 28 wherein the means for selecting a location in the outer area of the window additionally comprises:

means for determining whether the selected location corresponds to another object; and means for selecting another location in the outer area of the window responsive to the selected location corresponding to another object.

31. The apparatus of claim 28 additionally comprising:

g. means for sequentially selecting as the selected object each object in the plurality that was not selected by means a or f.

32. The apparatus of claim 28 wherein each object has an original size, the apparatus additionally comprising:

means for comparing the size of the object with a predetermined size responsive to the selected object having an original position outside the window;

means for selecting a size corresponding to the predetermined size responsive to the size of the selected object exceeding the predetermined size; and means for selecting the original size of the selected object responsive to the size of the selected object not exceeding the predetermined size; and wherein the means for displaying comprises means for displaying the selected object at the selected size.

33. The apparatus of claim 32 wherein the characteristics of the objects additionally comprise at least one selected from an original shape, an original color and an original intensity, the apparatus additionally comprising:

means for selecting at least one characteristic selected from a new shape different from the original shape, a new color different from the original color and a new intensity different from the original intensity responsive to the selected object having an original position outside the window; and means for selecting at least one characteristic selected from the original shape, the original color and the original intensity responsive to the selected object having an original position inside the window; and wherein the means for displaying comprises means for displaying the object using at least one characteristic selected from the shape, color and intensity selected.

34. The apparatus of claim 26 wherein at least one of the objects in the plurality has a level in a hierarchy, and the means for displaying the object comprises:

means for determining the level in the hierarchy of the object; and means for rendering the object in a color responsive to the determined level in the hierarchy.

* * * * *